UNITED STATES PATENT OFFICE 2,506,985

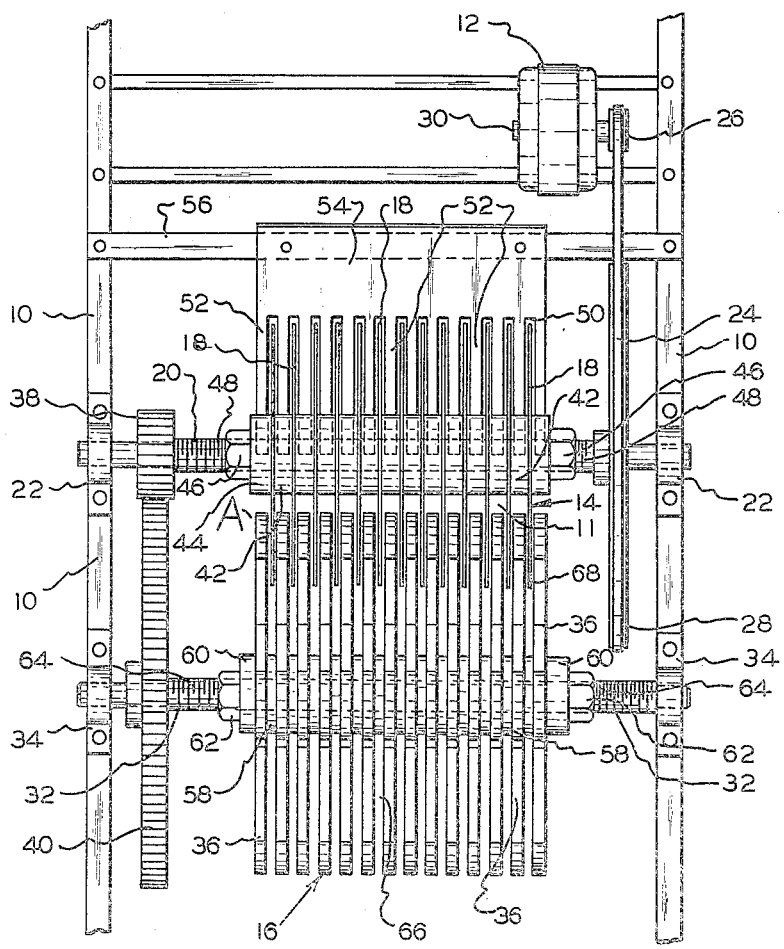
Fig. I.
Inventor
HERALD P. ARNT
By Beaman & Patch
Attorneys

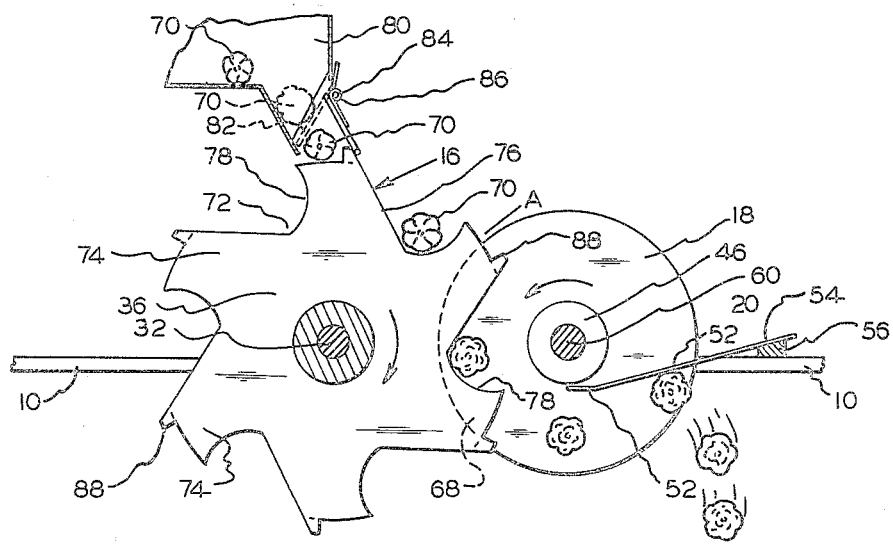
Fig. II.
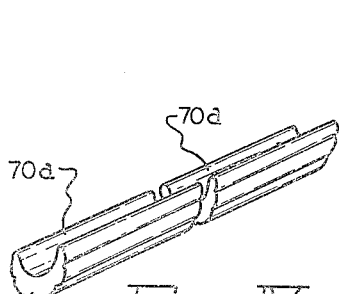
Fig. IV.
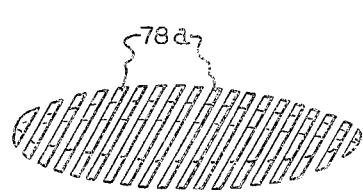
Fig. V.
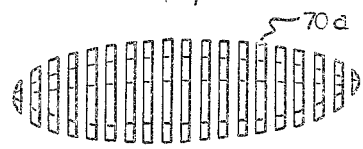
Fig. VI.
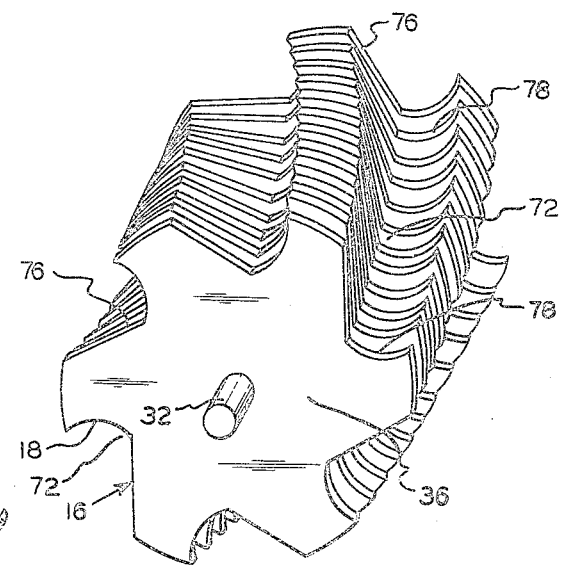
Fig. III.
Inventor
HERALD P. ARNT
By Kenman & Patch
Attorneys

SLICING MACHINE, INCLUDING SPACED DISK CUTTERS AND ROTARY FEEDER

Herald P. Arnt, Litchfield, Mich.

Application November 18, 1947, Serial No. 786,730

2 Claims. (Cl. 146—98)

This invention relates to machines for slicing vegetables or like articles of the character of cucumber pickles, celery, string beans and the like, and which are of a relatively soft and compressible consistency.

It is an object of the invention to provide a machine by which the dividing of such articles into well defined slices may be effected in an expeditious and efficient manner.

It is also an object of the invention to provide a machine which can be employed to slice cucumber pickles, celery, asparagus, string beans and like vegetables and deliver the slices for use without tearing or damaging the slices, so that there is a minimum of wastage.

Other objects and advantages of the invention and the patentable novel features thereof will appear apparent from a consideration of the foregoing description and claims.

In the accompanying drawings—

Figure 1 is a plan view of one embodiment of the invention,

Figure 2 is section on the line a—a of Figure 1,

Figure 3 is a perspective end view of the toothed disc assembly upon which the articles to be sliced are supported for presentation to the slicing discs and Figures 4, 5, and 6 are views showing typical slices produced with the use of the invention.

In carrying the invention into effect in one convenient manner as illustrated in the drawings a slicing machine is provided comprising a framework 10 supporting an electric motor or other suitable source of driving power 12 operatively connected with a multiple slicing disc assembly, indicated generally at 14, and with a multiple toothed disc assembly, indicated generally at 16.

The slicing disc assembly consists of a plurality of similar discs 18 mounted in axially spaced relationship upon a shaft 20, rotatably supported in suitable bearing blocks 22 and driven from the motor 12, as through the medium of the belt drive 24, which includes a relatively small diameter driving pulley 26 and a large diameter driven pulley 28. The latter transmits the desired rotation to the shaft 20 at a reduced speed, compared with the speed of rotation of the motor shaft 30, which speed of rotation of shaft 20, however, is greater than the speed of rotation of the other shaft 32, rotatably supported upon the machine frame work 10 in suitable bearing blocks 34 and supporting, for rotation therewith, a plurality of similar and axially spaced toothed discs 36, constituting the toothed disc assembly above mentioned.

The required driving connection between the shafts 20 and 32 is conveniently secured through the medium of the small gear wheel 38 meshing with a large gear wheel 40. The construction and arrangement is such that the assembly of slicing discs rotates at a relatively fast speed, compared with the speed of rotation of the assembly of toothed discs, and that the latter rotate in the opposite direction to the direction of rotation of the slicing discs and in such manner that both directions of rotation are downwardly with respect to a zone A, where the slicing discs and the toothed discs have inter-leaved relationship with respect to each other and in which zone the slicing operation is carried out.

The slicing discs 18 are of a somewhat flexible character, whereby they are capable of yielding somewhat to pressure exerted between them but the discs are firmly secured in position upon their operating shaft 20 through the medium of spacing washers 42 and end clamping washers 44, the necessary compression being conveniently effected through the actuation of clamping nuts 46 secured upon screw-threaded portions 48 of the shaft 20. It will be seen, therefore, that the individual slicing discs are firmly clamped in position around their inner peripheral portions while leaving, however, the outer peripheral and the major portions of the discs 18 free to extend into the gaps 66 between the toothed discs 36. The outer peripheral edges of the slicing discs are relatively sharp so that they may perform the desired slicing operation in the said zone A.

Mounted at the side of the assembly of slicing discs 18, remote from the toothed discs 36, there is a comb plate 54 itself conveniently mounted upon a transverse bar 56 of the machine framework and having its teeth 52 disposed to extend into the gaps 11 between the adjacent slicing discs but so as to provide clearance therewith, as shown in Figure 1. These comb teeth are preferably inclined downwardly from their entry ends and also preferably terminate immediately beneath the spacing washers 46 for the slicing discs.

The toothed discs 36 are also axially spaced from one another by means of spacing washers 58 and end clamping washers 60 which are subjected to the compressive force of the nuts 62 tightened upon the screw-threaded portions 64 of the rotary shaft 32. The arrangement of these axially spaced toothed discs 36 is such as provides circumferential gaps 66 into which portions of the slicing discs, indicated at 68 in Figures 1 and 2, enter to constitute the aforesaid zone A, where the actual slicing operation is carried out.

The toothed discs 36 function as a rotatable carrier for the articles to be sliced by these articles, indicated at 70, and consisting for instance, of cucumber pickles, being carried around and supported in longitudinal channels or pockets 72 formed between the adjacent teeth 74 of the toothed discs, it being noticed that these teeth are all similar and that each tooth has a straight inclined leading edge 76 (the inclination being rearwardly with respect to the direction of rotation of the toothed discs) and a concave trailing edge 78.

The articles to be sliced are conveniently supported in an overhead hopper or like device 80, Figure 2, and retained in the hopper by a bottom flap closure 82 pivotally mounted at 84 and normally spring biased into the closed position, as shown in dotted lines in Figure 2, so as to maintain the articles 70 within the hopper. This flap closure 82, however, is arranged to be automatically actuated and moved into the open position, as shown in dotted lines in Figure 2, in order to release the articles to fall into the pockets 72 as these are brought successively into position opposite the hopper.

Provision may be made whereby the hopper closure flap 82 is tripped automatically into the open position as the teeth 74 arrive opposite the flap. This may be accomplished by the teeth of one of the toothed discs (such as one of the outside such discs) being formed with radially extending projections 88 arranged to make contact with the free edge of the flap to swing the same open against the action of its spring 86. In this way each pocket 72 is loaded as it is brought opposite the hopper and the machine is therefore continuous in operation.

The mode of securing the toothed discs 36 upon the supporting shaft 32 and as above described, that is, by the spacing washers 58 and the clamping nuts 62, is such as permits the longitudinal shape and direction of the pockets or channels 72 to be readily varied from the truly longitudinal to a slightly inclined or partly spiral shape, such as is shown in Figure 3. When the pockets are truly longitudinal the articles will be sliced as shown in Figure 4 (which represents a piece of celery sliced into two pieces 70a) or in Figure 6 (which represents a pickle cucumber sliced into a number of pieces 70a) whereas when the pockets are slightly inclined or partly spiral in shape the direction of the slicing cuts will be as shown in Figure 5 which also shows a pickle cucumber sliced into a number of separate slices 70a. This will result from the fact that the articles to be sliced will take up an inclined position within the pockets 72, when the toothed discs are adjusted to form the inclined or partly spiral pockets and will be presented to the slicing discs while in such position.

An advantage of the slicing disc assembly resides in the fact that the construction permits of the thickness of the cut (or cuts) being readily varied from a minimum to a maximum simply by an appropriate arrangement or selection of the spacing washers, which cutter may be of uniform or varying thickness, and employed as and where required between the adjacent slicing discs. A particularly important advantage of the invention resides in the flexible construction of the slicing discs 18 and the mounting thereof with respect to the comb teeth 52 so that there is normally a slight clearance on either side of the portion of each slicing disc entered into the gap between and adjacent pair of the comb teeth. The construction and arrangement is such that the outer peripheral disc portions are properly localized by their entrance between the comb teeth, while at the same time these portions of the adjacent discs are capable of being deflected, by the pressure of the slices entered into the gaps between them during the slicing operation, in order to prevent damage to the slices by their becoming wedged in said gaps.

Having thus described my invention, what I claim as new and desire to protect by Letters Patent is:

1. In a machine for slicing vegetables, including in particular, cucumber pickles, and comprising an axially spaced series of rotary cutter discs adapted to cut the vegetables into slices, a rotary feed means adapted to support and feed the vegetables successively to said cutter discs, said feed means comprising a rotary shaft, a plurality of discs each having circumferentially spaced pockets open to their outer periphery and collectively defining channels in which the vegetables are received in succession, each said disc being independently and freely rotatable relative to said shaft, and means mounting said feed discs upon said shaft to permit the said discs to rotate as one with the shaft in the form of an axially spaced feed disc assembly, said mounting means being adjustable to permit the said disc assembly to be angularly adjusted relatively to the shaft whereby to permit said channels to run either parallel with the shaft or at an angle relatively thereto, said mounting means including spacers between adjacent discs and axial adjustable clamping structure on said shaft, engaging with the outer discs to hold all of the discs in rigid frictional engagement with each other and with respect to said shaft.

2. A machine as claimed in claim 1, said discs having concave trailing edges and inclined leading edges, the latter being inclined rearwardly with respect to the direction of rotation.

HERALD P. ARNT.

REFERENCES CITED

The following references are of record in the file of this patent:

UNITED STATES PATENTS

| Number | Name | Date |
|---|---|---|
| 252,128 | Monts | Jan. 10, 1882 |
| 1,323,591 | Hara | Dec. 2, 1919 |
| 1,538,476 | Elsner | May 19, 1925 |
| 1,750,431 | Rogers | Mar. 11, 1930 |
| 2,138,262 | Urschel et al. | Nov. 29, 1938 |